BEST AVAILABLE COPY
P. KLINGLE.
Steam-Plow.
No. 194.
A. I Patented Mar. 9 1858
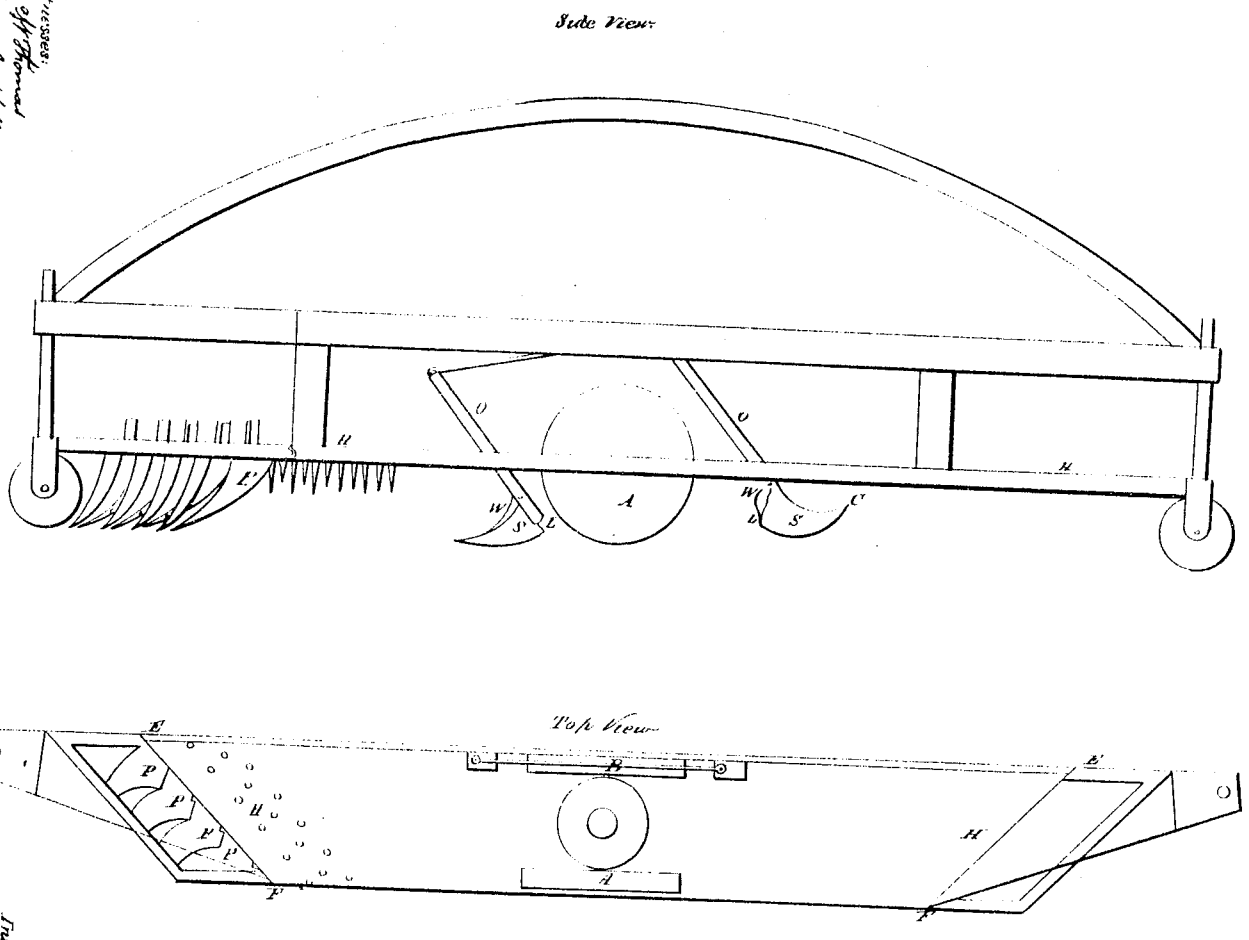
Witnesses:
Jno Jeff Thomas
Harry Mitchell
Inventor:
Pence Klingle
N. PETERS, PHOTO-LITHOGRAPHER, WASHINGTON, D. C.

BEST AVAILABLE COPY

UNITED STATES PATENT OFFICE.

P. KLINGLE, OF WASHINGTON, DISTRICT OF COLUMBIA.

IMPROVEMENT IN STEAM-PLOWS.

Specification forming part of Letters Patent No. 19,427, dated February 23, 1858; Additional Improvement No. 194, dated March 9, 1858.

*To all whom it may concern:*

Be it known that I, PEIRCE KLINGLE, of the county of Washington, District of Columbia, have made an Improvement on my Invention of a Steam-Plow for which I did obtain Letters Patent dated on the 23d day of February, 1858.

The nature of my improvement consists in placing a double-mold-board plow as a clearer in front of the off bearing-wheel of my machine, so that when, instead of a single plow of the width of the machine, (as described in the Letters Patent,) I may use at each end a gang of small plows, it will open a furrow of the width of the wheel to permit the wheel to tread on the furrow-bottom, while the wheel that is upon the land side of the plows will tread in the furrow of the hindmost plow of the gang. Another clearer is placed on the other side of the wheel, opposite to the first, to cause a similar effect during a reverse motion. Each clearer is to be so arranged that as it follows behind the wheel it will turn the earth back into and will fill up the furrow that has been opened by its fellow, and so that the one will throw the other out of gear.

To enable others skilled in the art to make and use this improvement in my machine, I will proceed to describe its construction and operation; and I do hereby declare that the following is a full and exact description thereof, reference being had to the accompanying drawing, and to the letters of reference marked thereon.

Having detached the single plows described in the original Letters Patent, I attach in the same place and in the same way at each end of the machine, at E F and F E, a gang of small plows, P P P, &c., that will be hinged and governed in precisely the same manner as the single plows aforesaid. Through the floor of the machine and behind each gang I make a proper number of small holes to correspond with the teeth of the harrows H H, which pass through them and level the ground as it is plowed. It will now be seen that when the machine begins to operate but one of the bearing-wheels will have a clear furrow to tread in—namely, the wheel A upon the land side of the machine, which follows behind and in the furrow of the rear plow of the gang. The bearing-wheel B upon the off side would therefore have to be forced over the fresh-plowed soil. To avoid this I place before it a clearer, S, of the width of the wheel B, to open a track, and there being two of these clearers, S and S, (the wheel B having also a reverse motion,) the clearer S which follows behind the wheel B will draw the earth back again, (having been thrown out of gear by the connecting-rod R, between the tops of the standards O O belonging to the clearers S.S, and by the hinge W W at the foot of the standards O O,) and will thus fill up the furrow and leave all smooth upon the surface of the ground, the harrows H H completing the work.

The filling up of the furrow that has been opened by the forward clearer S is done by throwing the clearer S which follows the wheel B out of gear, and it hinging at W, when the wings L L of the double mold-board enter the double furrow-slice that has been thrown over by the forward clearer S the point C of the clearer S that is behind the wheel is thrown up, while the points of the wings L L enter the soil upon each side of the open furrow, and taking up the dirt that has been thrown out of it turn it back again, fill up the furrow, and restore it to the position that it was in before it had been disturbed by the forward clearer S. The advance motion of the clearer S before the wheel B opens the furrow, while the reverse motion of the clearer S behind the wheel B fills it up again, the harrows finishing the work.

Having thus described the construction and operation of the improvement I have made in my machine, what I claim as my improvement, and desire to secure by Letters Patent, is—

The placing of clearers S S, in connection with the off bearing-wheel, B, of my steam-plow, in such a manner that the one will fill back the furrow that the other has opened, they being arranged, constructed, and operated substantially in the manner and for the purpose herein described and set forth.

PEIRCE KLINGLE.

Witnesses:

JNO. W. THOMAS,

HARVEY MITCHELL.